United States Patent [19]

Robinson et al.

[11] 4,102,760

[45] Jul. 25, 1978

[54] CHLORINATION OF POLY (VINYLIDENE FLUORIDE) USING U-V RADIATION

[75] Inventors: Donald Nellis Robinson, Collegeville, Pa.; Adrian Samuel Fox, Framingham, Mass.

[73] Assignee: Pennwalt Corporation, Philadelphia, Pa.

[21] Appl. No.: 761,153

[22] Filed: Jan. 21, 1977

[51] Int. Cl.$^2$ .............................. C08F 8/18; C08F 8/34
[52] U.S. Cl. .................................. 204/159.18; 526/18; 526/43
[58] Field of Search ..................... 204/159.18; 526/18, 526/43

[56] References Cited

U.S. PATENT DOCUMENTS

| 3,320,210 | 5/1967 | Caldwell et al. ...................... 260/47 |
| 3,558,582 | 1/1971 | Bacskai .............................. 260/92.1 |
| 4,006,120 | 2/1977 | Rettore et al. ......................... 526/17 |

FOREIGN PATENT DOCUMENTS 48-42474  12/1973  Japan.

Primary Examiner—Richard B. Turer

[57] ABSTRACT

Vinylidene fluoride polymer resin dispersed in carbon tetrachloride is chlorinated at elevated temperature in the presence of a specified initiator compound and triethanolamine and with exposure to ultraviolet light.

7 Claims, No Drawings

CHLORINATION OF POLY (VINYLIDENE FLUORIDE) USING U-V RADIATION

This invention relates to the effective post chlorination of vinylidene fluoride polymer to provide a chlorinated resin having a number of improved properties for the resin and articles prepared therefrom. Examples of these improvements include reduced melting point, increased transparency, increased oxygen index (reduced flammability), reduced oxygen permeability, increased solubility, reduced modulus, and chlorine funtionality (chemical reactivity).

Chlorination of various addition polymer resins is known in the art. The chlorination of crystalline polyvinylidene fluoride is shown in U.S. Pat. No. 3,558,582 to Bacskai wherein the resin, dispersed in a perchlorinated hydrocarbon, is subjected to refluxing temperatures while bubbling chlorine gas through the dispersion. Japanese patent publication No. 73/42474 discloses the chlorination of polyvinyl fluoride by dispersing the resin in carbon tetrachloride containing tertiary butyl peroxypivalate and triethanolamine and heating the mixture to 20° – 70° C. while blowing chlorine therethrough. Ultraviolet radiation is used, for example, in U.S. Pat. No. 3,546,195 to catalyze the chlorination of polybutene-1 dissolved in a perchlorinated hydrocarbon solvent containing a peroxide catalyst and maintained at a temperature below 60° C. while vaporizing chlorine into the solution.

Although, U.S. Pat. No. 3,558,582 teaches that chlorination may be accomplished by employing photochemical, free-radical catalyst or other conventional chlorination catalysts, the working examples in the patent specification do not disclose the use of a catalyst by the patentee during chlorination. It has now been found that by the employment of the proper combination of catalysts for the chlorination of vinylidene fluoride polymer resin an unexpected increase in chlorination (percent chlorine chemically affixed to the resin) is obtained.

Accordingly, this invention is a method of chlorinating vinylidene fluoride polymer resin which comprises reacting said resin dispersed in carbon tetrachloride with gaseous chlorine preferably at a pressure in the range of from about 1 to 15 atmospheres and at a temperature in the range of from about 50° to 150° C., in the presence of (a) a catalytic amount of triethanolamine and (b) a catalytic amount of an initiator compound selected from the group consisting of acyl peroxides and azo compounds, and with the exposure of the reaction to a catalytic amount of ultraviolet radiation.

The vinylidene fluoride polymer of this invention is a homopolymer resin of vinylidene fluoride or a copolymer resin of vinylidene fluoride with less than 10 mol percent of a copolymerizable monomer, e.g., ethylene, tetrafluoroethylene, hexafluoropropene, vinyl fluoride, and the like.

The vinylidene fluoride polymer resin, preferably in powder or particulate form, is usually dispersed in the carbon tetrachloride in an amount ranging from about 100 to about 400 grams per liter of inert liquid medium.

The initiator compound is used in catalytic amounts and preferably in amounts ranging from about 0.5 up to about 2.5 grams of initiator for each 100 grams of vinylidene fluoride polymer used. The acyl peroxide initiators include for example, t-butyl peroxypivalate, t-butyl peroxyisobutyrate, acetyl peroxide, t-butyl peroxyoctoate and benzoyl peroxide, the azo compounds include for example 2,2'azo-bis (isobutyronitrile), 2,2'azo-bis-2-methylvaleronitrile, and 2,2'-azo-bis-2,3,3-trimethylbutyronitrile.

Triethanolamine is used in catalytic amounts and preferably in amounts ranging from about 1.0 grams up to about 20 grams per 100 grams of vinylidene fluoride polymer to be chlorinated.

Exposure of the chlorination reaction to ultraviolet light is accomplished in a known manner and preferably by exposure of the reaction to a quartz mercury vapor lamp having a minimum intensity of 450 watts and which emits about 28% of its energy in the ultraviolet region such lamp being separated from the reaction medium by a water-jacketed quartz immersion well.

The pressure at which the chlorination reaction proceeds is not critical and is preferably from about 1 to about 15 atmospheres, most preferably about 1 atmosphere.

The reaction is carried out at a temperature ranging from about 50° to 150° C, depending upon the pressure. Preferably the reaction temperature (reflux) is between 70° and 80° C. when carried out at ambient pressure in carbon tetrachloride.

Chlorine is passed through the inert liquid medium containing the dispersed or dissolved vinylidene fluoride polymer at a rate preferably ranging from about 0.5 up to about 3 moles of chlorine per 100 grams of vinylidene fluoride polymer in the reaction medium.

The following examples are set forth to demonstrate this invention.

EXAMPLE 1

A 400 ml cylindrical glass reactor was equipped with a quartz immersion water-cooled condenser containing a Hanovia 450 watt quartz mercury vapor lamp. The reactor was also equipped with a gas inlet tube extending to the bottom of the reactor and a gas outlet tube connected to a dry ice condenser which was connected to a trap containing 20% potassium hydroxide solution. The reactor was shielded with opaque material.

A mixture of vinylidene fluoride homopolymer (100 g., 1.6 moles vinylidene fluoride equivalent), carbon tetrachloride (400 ml.) triethanolamine (5.0 g) and 2,2'azo bis (isobutyronitrile) (1.0 g.) was placed in the reactor. The mixture was agitated and sparged with nitrogen for about 15 minutes. Then, chlorine was introduced, via a calibrated rotameter at a rate of 200cc/minute for 3 hours and 40 minutes. (1.8 moles chloride). The mercury vapor lamp was on during the same period. The temperature rose to reflux within 15 minutes after the lamp had been turned on.

After 3 hours and 40 minutes, both chlorine and irradiation were stopped. The mixture was cooled under nitrogen and poured into a 1/1 mixture of methanol/water (500 ml.). The solid product was filtered and washed with a 1/1 methanol/water water mixture (1 liter). It was re-filtered, air-dried overnight, and vacuum-dried 4 hours at 80° C.

The dry product weighed 106 g., possessed 11.8% chlorine and had a DSC* melting point of 132° C. An excellent, transparent film was cast from a dimethyl acetamide solution of the product.

*Differential Scanning Calorimeter

EXAMPLES 2–10

The chlorination was carried out in a manner similar to that described in Example 1 except for the time of chlorination, initiator and amine catalysts. A summary of conditions and results is found in Table 1.

EXAMPLE 11

In an attempt to duplicate the results shown for the process as carried out in Example 1 of U.S. Pat. No. 3,558,582, that procedure was repeated as shown in the patent and the result obtained is also set forth in Table I following:

TABLE I

| Ex. No. | UV | Initiator | Mol. Ratio ($VF_2/Cl_2$ Equivalent) | Amine | Product % Cl |
|---|---|---|---|---|---|
| 2 | Yes | None | 1.56 | None | 3.3 |
| 3 | Yes | Vazo (1 g.) | 1.56 | None | 8.9 |
| 4 | Yes | Lupersol-11 (1.g) | 1.56 | None | 8.7 |
| 5 | Yes | Lupersol-8 (1 g.) | 1.56 | None | 7.3 |
| 6 | Yes | None | 1.56 | Triethanol-amine (5 g.) | 5.5 |
| 7 | Yes | None | 1.56 | Triethyl-amine (5 g.) | 0.20 |
| 8 | Yes | Vazo (1 g) | 1.56 | Triethanol-amine (5 g.) | 5.1 |
| 9 | Yes | Lupersol-8 (1 g.) | 0.78 | Triethanol-amine (5 g.) | 11.2 |
| 10 | Yes | Vazo (1 g.) | 0.85 | Triethanol-amine (5 g.) | 12.2 |
| 11 | No | None | 0.92 | None | 0.0 |

UV 450 watt quartz mercury vapor lamp
Vazo Azo bis (isobutyronitrile)
Lupersol-11 t-butyl peroxypivalate (75% in mineral spirits)
Lupersol-8 t-buty peroxyisobutyrate (75% in benzene)

The results shown in the above table demonstrate that (1) the results obtained in Example 1 of U.S. Pat. No. 3,558,582 could not be duplicated; (2) chlorination using triethylamine in place of triethanolamine was retarded; and (3) the combination of ultraviolet light, triethanolamine and specified initiator provide unexpectedly high post chlorination of vinylidene fluoride polymer.

The properties of a chlorinated vinylidene fluoride homopolymer compared to those of the non-chlorinated resin are shown in the following table:

TABLE II

| Property | Chlorinated Resin | Non Chlorinated Resin |
|---|---|---|
| % Cl | 12.0 | 0.0 |
| Melting Point | 132° C | 155,157° C. |
| Brittle Temp. | −78° C | <−78° C. |
| Film Transparency (X filter) | 86% | 67% |
| Modulus at 20° C | $1.2 \times 10^5$ psi | $1.8 \times 10^5$ |
| Modulus at 100° C | $1.0 \times 10^4$ | $5.1 \times 10^4$ |
| Oxygen Index | 55 | 40 |
| Film Permeability to $O_2$ | 0.09 barrers | 0.14 barrers |
| Solubility in Acetone | 43 g./100 g. solvent | 0.066 g./100 g. solvent |

We claim:

1. A method of chlorinating vinylidene fluoride polymer resin which comprises reacting said resin dispersed in carbon tetrachloride with chlorine at a pressure in the range of about 1 to about 15 atmospheres, a temperature in the range of from about 50° to about 150° C. in the presence of (a) a catalytic amount of triethanolamine and (b) a catalytic amount of an initiator compound selected from the group consisting of acyl peroxides and azo-compounds, and with accompanying exposure of the reaction to a catalytic amount of ultraviolet radiation.

2. The method of claim 1 wherein the reaction is carried out at refluxing temperature for the reaction medium.

3. The method of claim 1 wherein the pressure is about atmospheric and the temperature ranges from about 70° to about 80° C.

4. The method of claim 3 wherein the amount of triethanolamine ranges from about 1 up to about 20 grams per 100 grams of resin.

5. The method of claim 4 wherein the initiator compound is tertiary butyl peroxyisobutyrate or 2,2′-azo-bisisobutyronitrile used in an amount of from about 0.5 up to about 2.5 gram per 100 grams of resin.

6. The method of claim 5 wherein the ultraviolet exposure is provided by a quartz mercury vapor lamp.

7. The method of claim 3 wherein the vinylidene fluoride polymer is a homopolymer.

* * * * *